Dec. 16, 1941. E. EGER 2,266,592
METHOD AND APPARATUS FOR WRAPPING ANNULAR OBJECTS
Filed Nov. 24, 1939 5 Sheets-Sheet 4

INVENTOR.
ERNST EGER
ATTORNEYS.

Patented Dec. 16, 1941

2,266,592

UNITED STATES PATENT OFFICE 2,266,592

METHOD AND APPARATUS FOR WRAPPING ANNULAR OBJECTS

Ernst Eger, Grosse Pointe Park, Mich., assignor to United States Rubber Company, New York, N. Y., a corporation of New Jersey Application November 24, 1939, Serial No. 305,821

13 Claims. (Cl. 93—2)

This invention relates to improvements in wrapping machines, and in particular to a method and apparatus for wrapping annular objects, such as pneumatic tires. More particularly, the invention relates to a machines for applying a sheet of wrapping material, such as paper, to a pneumatic tire in a manner resulting in the formation of a succession of transverse plaits, applying the plaited paper to the inner circumference of the annulus of the object, or rim periphery of the tire, folding the paper transversely about the tire, and joining the marginal portions of the paper at the outer circumference of the annulus of the object or tread of the tire.

In wrapping pneumatic tires it has been customary to provide a wrapper composed of a length of paper ribbon applied spirally around the annulus of the tire, with each individual turn partly overlapped by the preceding turn. Adjacent overlapping in this manner involves duplication of thickness of paper and represents an excessive use of paper in tire packaging. Furthermore, overlapping of adjacent turns of paper ribbon has often been found ineffective in excluding dust and dirt from the tire. This condition has been particularly objectionable when the wrapped tires have white sidewalls. A moderate shock on the periphery of a tire so wrapped is sufficient to cause rupture of one or more of the turns of paper, resulting in unwinding of the wrapper and necessitating rewrapping.

In wrapping a tire by the machine and method as embodied in my invention, a single sheet of paper is employed to enclose the entire tire, thus providing a continuous envelope which effectively excludes dust and dirt from the tire.

Among the objects of the invention are, to provide an automatic machine capable of uniformly and efficiently packaging annular articles by a method resulting in economy in wrapping material consumption, increased resistance against rupture, and increased protection of the article. These and other objects and advantages appear more fully in the following detailed description, when considered in connection with the accompanying drawings, in which:

Fig. 1 is a plan view illustrating a preferred embodiment of my invention;

For the purpose of describing this invention a pneumatic vehicle tire 20 has been selected as an annular object which may be wrapped, and the invention is illustrated in reference to a tire wrapping machine as shown in the drawings. All of the views of the machine show the parts in the tire wrapping position, that is, the position they occupy when the tire is being wrapped. As will be explained it will be necessary to move certain of the parts to other positions in order to insert the tire in, or remove it from the machine.

Figures 1, 12:
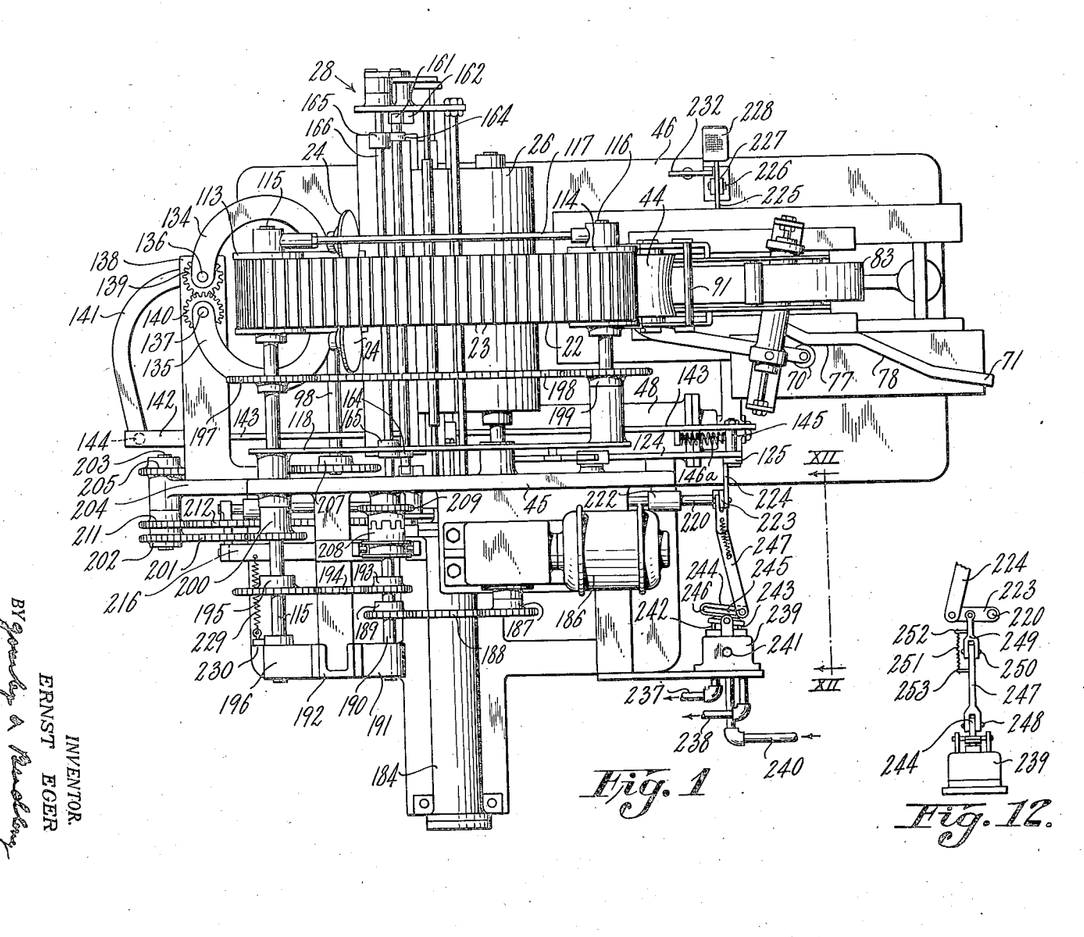
Figures 2, 11:
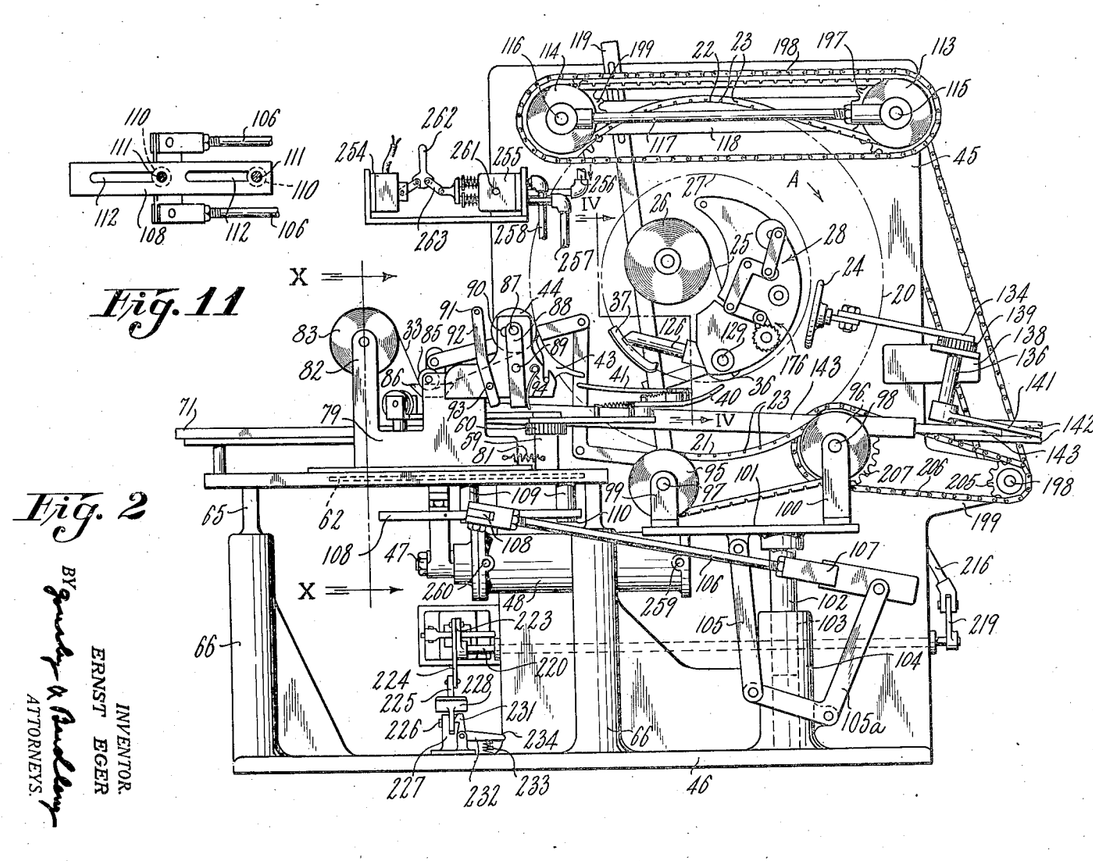
Fig. 2 is a front view thereof in elevation.
Fig. 11 is a plan view of a drive plate for moving a part of the tire clamping mechanism into and out of tire wrapping position; and, Fig. 12 is an end view of a detail of the machine from line XII—XII of Fig. 1, looking in the direction of the arrows.

Referring to Fig. 2 the tire 20 (shown in dot and dash lines) is held between a lower belt 21 and an upper belt 22. The belts 21 and 22 are driven so as to rotate the tire in the direction of the arrow A, and are provided with grooves 23 to increase the traction of the belts on the tire. The beads of the tire are held in relatively close relationship by a pair of rollers 24 (Fig. 1), between which the beads are positioned. As the tire 20 is rotated it is wrapped with wrapping material, such as paper 25, supplied from the roll 26, which extends within the rim perimeter, or inner circumference 27, of the annulus of the tire.

After the paper strip 25 leaves the roll 26 and before it is applied to the tire 20, it passes through a plaiting mechanism 28 which is shown in detail in Fig. 6, and will be hereinafter described. The plaiting mechanism 28 forms transverse plaits 29 in the paper strip 25 which is then wrapped around the tire 20, as shown in Figs. 7 and 8, by applying the longitudinal central portion of the strip of plaited paper 25 circumferentially to the rim perimeter 27 of the tire 20, and guiding or folding the lateral portions of the paper on each side of the central portion around the transverse contour of the tire, that is, transversely around the sidewalls 30 and tread 31 of the tire. As shown particularly in Fig. 8, the longitudinal edges 32 of the wrapping paper 25 are brought adjacent to each other and joined by an adhesive strip of paper 33 applied over the tread 31 or outer circumference of the annulus of the tire 20. The plaited paper 25 is progressively applied to the rim perimeter 27 of the tire and folded around the transverse contour thereof until the tire 20 has been rotated through slightly more than a complete revolution so as to provide an overlap for the ends of the strip 25 and complete the tire wrapper 34, shown in cross section in Fig. 8. The apparatus for carrying out the foregoing method of applying the paper to the tire will now be described.

*Paper folding and applying mechanism*

The paper folding and applying mechanism is best shown in Figs. 2 and 7. Referring particularly to Fig. 7, the paper strip 25 is led from the roll 26 through the plaiting mechanism 28, which for clearness is not shown in this figure. After being plaited the paper is passed through the feed rolls 35 mounted in the plaiting mechanism 28. The plaited paper 25 is then passed underneath a roll 36 and a shoe 37 which apply the central longitudinal portion of the paper to the rim perimeter 27 of the tire 20. The paper passes from the roll 36 between the tire 20 and the groups of fingers 38 and 39 which fold the plaited paper 25 transversely around the side walls 30 of the tire. Each of the groups 38 and 39 of fingers have two fingers 40 and 41, and the corresponding fingers in each group are alike, excepting they are made in pairs of "rights" and "lefts." The fingers 40 and 41 extend downwardly and forwardly in the direction of rotation of the tire and gradually unfold the plaits 29 from the rim perimeter 27 towards the tread 31 of the tire as the paper progressively passes underneath the fingers. The overall length of the plaited paper 25 on each side of the rim perimeter is thus increased to make the paper conform to the shape of the annulus as it is guided or folded around the transverse contour of the tire. As the paper 25 leaves the forward ends 42 of the groups 38 and 39 of the fingers, the paper passes between the tire 20 and a pair of shoes 43 which fold the paper 25 about the tread circumference 31 of the tire. Only one shoe 43 of the pair is shown, but one such shoe is located on each side of the tire opposite the other, and they bring the edges 32 of the paper 25 sufficiently close together that they may be joined by the adhesive strip 33 which is applied by a roller 44 to the paper.

*Mechanisms for supporting the paper folding and applying, plaiting, and tire holding mechanisms and for moving the paper folding and applying mechanism and the tire holding mechanism into the operative position for applying the paper wrapping and into the inoperative position for the insertion and removal of the tire*

Referring to Figs. 1 and 2, the above mechanisms are mounted on an upright support 45 and a base 46 constituting the principal parts of the frame of the machine. The paper plaiting mechanism 28 is mounted in a fixed position on the upright support 45. When the tire 20 is being placed in the machine its rim perimeter 27 is slipped over the front end of the paper roll 26 and the paper plaiting mechanism 28. After the tire has been placed in the machine, and is ready to be wrapped, the elements of the machine and the tire occupy the positions shown in Figs. 2 and 7. Before this can be done, however, all of the elements which operate directly upon the tire, excepting the paper applying roll 36 mounted in the fixed plaiting mechanism 28, must be moved away from their positions shown in Fig. 2. The lower belt 21 which supports the tire 20 is moved downwardly so that clearance is provided between the rim perimeter 27 of the tire and the paper applying roll 36. The upper belt 22 is pivoted in an upward direction. The rolls 24 which operate upon the side walls 30 of the tire 20, to hold the beads in close relationship, are swung outwardly from the side walls. The shoe 37 which holds the paper against the rim perimeter 27 of the tire is moved inwardly towards the center of the tire. The groups 38 and 39 of the paper folding fingers are moved to the left as viewed in Fig. 2, and at the same time are swung away from the side walls 30 of the tire. The pair of shoes 43 which fold the paper around the tread 31 of the tire, and the adhesive paper applying roll 44 together with the adhesive paper supply mechanism are moved to the left, as viewed in Fig. 2, and away from the tread of the tire. All of such elements are moved more or less simultaneously by a piston rod 47 connected to a piston operating in a cylinder 48. The mechanisms connecting the piston rod 47 to such elements will now be described.

*Mechanism for supporting and moving the paper guiding or folding fingers*

Referring to Figs. 2 and 7 the groups 38 and 39 of fingers are mounted on arms 49 and 50. Since the corresponding fingers 40 and 41 of the groups 38 and 39 are similar, and they are mounted on the arms 49 and 50 in like manner, the mounting of only one group of such fingers will be described. The finger 40 of group 38 is pivotally mounted on the end of the arm 49 at 51. A spring 52, having one end attached to the finger 40 to the left of the pivot 51, and the other end attached to a post 53 on the arm 49, normally resiliently holds the finger 40 in contact with the paper 25 and presses it against the side walls 30 of the tire. A second post 54 fixed to the arm 49 is placed in the path of movement of the left end of the finger 40 to limit the inward movement of the other end of the finger. The finger 41 is mounted on a pivot 55 secured to the finger 40, and is normally moved inwardly against the wrapping paper 25 by a spring 56 having one end secured to an arm 57 on the finger 41 and the other end secured to a post 58 fixed to the finger 40. A post 57a is secured to finger 40 and arranged in the path of movement of a projection on the finger 41 to limit its inward movement.

The finger supporting arms 49 and 50 are keyed to shafts (not shown) which are pivotally mounted in a post 59 and to which the meshing gears 60 and 61 are respectively keyed. Referring to Figs. 2 and 10, the post 59 is fixed to a plate 62 which is slidably mounted in a groove 63 formed in bars 64 supported by the bifurcated ends 65 of the posts 66 extending upwardly from the base 46 of the machine. The plate 62 is provided with a lug 67 to which one end of an arm 68 is attached. The other end of the arm 68 is secured to the piston rod 47 which is adapted to move the groups 38 and 39 of fingers away from the center of the tire.

The following described mechanism causes the arms 49 and 50 to spread and move the fingers away from the side walls of the tire. Referring to Figs. 7 and 10, the finger supporting arm 49 is provided with an extension 69 which is rigidly secured thereto at one end and the other end of the extension is provided with a roller 70 which cooperates with a track 71 supported by one of the bars 64. The roller 70 is retained in contact with the track by an air cylinder 72 having air under pressure supplied thereto through a hose 73. The air cylinder 72 is mounted upon a bracket 74 supported on the slidable plate 62. The piston rod 75 is actuated by the piston in the cylinder 72 and is connected to a member 76 which resiliently holds the roller 70 against the track 71.

Referring to Fig. 1, the track 71 is provided with a straight run 77 extending substantially parallel to the movement of the plate 62, and with an inclined run 78. As the piston rod 47 moves out of the cylinder it carries with it the arm 68, the post 59, and finger supporting arms 49 and 50. Such movement causes the roller 70 to move first along the straight track 77 and then along the inclined track 78 and swing the groups 38 and 39 of fingers away from the side walls of the tire. As the fingers 40 and 41 (Fig. 7) move outwardly their ends adjacent to the pivot points 51 and 55 strike the posts 54 and 57a and prevent the springs 52 and 56 from moving the opposite ends of the fingers further inwardly. The groups 38 and 39 of fingers are held spread apart and away from the side walls of the tire when the piston rod has moved out of the cylinder 48 to the end of its stroke.

*Mechanism for supporting and moving the adhesive paper applying mechanism, and the shoes which folds the wrapping paper around the tread of the tire.*

Referring to Figs. 2 and 10, the shoes 43 for folding the paper 25 around the tread of the tire is supported on a carriage 79 which in turn is supported on the slidable plate 62, and is slidably mounted in grooves formed between the plate 62 and the plates 80 which are secured to the bars 64. The carriage 79 is resiliently connected to the plate 62 by a spring 81 having one end secured to the carriage 79 and the other end connected to the post 59 on the plate 62. The spring 81 is always under tension and tends to pull the carriage 79 towards the post 59. In the tire wrapping position as shown in Fig. 2, the post 59 is spaced away from the carriage 79 and the spring 81 resiliently holds the shoes 43 against the wrapping paper 25. When the plate 62 is moved to the left as viewed in Fig. 2, the post 59, which supports the paper folding fingers, strikes against the right end of the carriage and moves it and the paper folding shoes 43 away from the outer circumference or tread 31 of the tire 20.

The adhesive paper applying mechanism is mounted in the carriage 79 and it comprises a pair of arms 82 for holding the adhesive paper roll 83 from which is drawn the adhesive strip 33 which is led underneath a roll 85 and through a wetting bath 86 and thence to the paper applying roll 44 which applies the adhesive strip 33 to the wrapping paper at the tread of the tire 20. The adhesive paper applying roll 44 is rotatively mounted on a shaft 87 which is mounted between a pair of arms 88, one on each side of the carriage 79. The arms 88 are pivoted on the side of the carriage at 89. The shaft 87 extends through slots 90 in the side of the carriage and is adapted to be operated within the slot by a handle 91. The handle 91 extends across the carriage (Fig. 10) and its ends are supported by one end of a pair of levers 92 which are pivoted on the side of the carriage at 93. The lower ends of the levers 92 are adapted to be moved by the handle 91 against the lower ends of the arms 88 and thereby move the shaft 87 in the slot 90 and hold the paper applying roll 44 away from the tread of the tire until the operator is ready to apply the adhesive paper strip 33 to the wrapping paper 25. When the adhesive tape 33 is being applied to the paper wrapping 25 and the handle 91 is in the position shown in Fig. 2, the paper applying roll 44 is resiliently held against the tread of the tire by a spring 94.

*Mechanism for supporting and moving the lower tire holding belt up and down*

The lower belt 21 (Fig. 2) is carried by pulleys 95 and 96 which are mounted respectively upon shafts 97 and 98. The shafts are mounted in brackets 99 and 100 which are supported on a platform 101 carried by a vertical column 102 which is slidable in a socket 103 formed in a vertical post 104 which is supported by the base 46 of the machine. The platform 101 carrying the lower belt 21 may be moved downward to provide clearance between the stationary paper applying roll 36 and the tire 20 so that the tire may be inserted in and removed from the machine. Such movement is effected by means of a linkage mechanism operated from the cylinder 48. The linkage mechanism comprises a pair of links 105 having their upper ends pivotally connected to the platform 101, and their lower ends pivotally connected to the ends of a pair of bell crank levers 105a which are pivoted on the post 104. One arm of each of the levers 105a are connected to a pair of rods 106 through a yoke 107. The rods 106 straddle the post 104 and one of the posts 66. They are connected to a cross head 108 which is operated by projections 109 extending from the plate 62. The projections 109 are provided with heads 110, which hold the cross head 108 on the projections. The heads 110 are provided with reduced portions 111 (Fig. 11) which operate in slots 112 in the cross-head. The reduced portions 111 operating in the slots 112, provide a lost motion connection between the cross-head 108 and plate 62, so that the paper folding and applying mechanism will be partially moved out of and into wrapping position before the lower belt 21 is so moved.

*Mechanism for supporting and moving the upper tire holding belt up and down*

The upper belt 22 (Fig. 2) is supported on pulleys 113 and 114 which are respectively keyed to shafts 115 and 116. The shaft 115 is rotatively mounted on the upright support 45. The shaft 116 is mounted in the movable ends of a spacer rod 117 and a spacer bar 118. The opposite ends of the rod 117 and bar 118 are pivoted on the shaft 115 so that the belt 22 can be pivoted about this axis and thereby moved upwardly to permit the removal of the tire from the machine. Referring particularly to Fig. 9 the shaft 116 may be moved about the shaft 115 by a vertically extending bar 119 which may be operated up and down by the piston in the cylinder 48. The upper end of the bar 119 is connected to the spacer bar 118 by a pin 120 which is secured to the bar 118 and extends into a slot 121 formed in the bar 119. The lower end of the bar 119 is connected to one end of a bell crank lever 122 which is pivoted on a pin 123 fixed in the upright support 45. The other end of the bell crank lever 122 is pivotally connected to one end of a link 124. The other end of the link 124 is connected to an upright arm 125 which is rigidly fixed to the piston rod 47 operated by the cylinder 48.

*Mechanism for supporting and moving the inner paper holding shoe toward and away from the rim perimeter of the tire*

Figure 4:
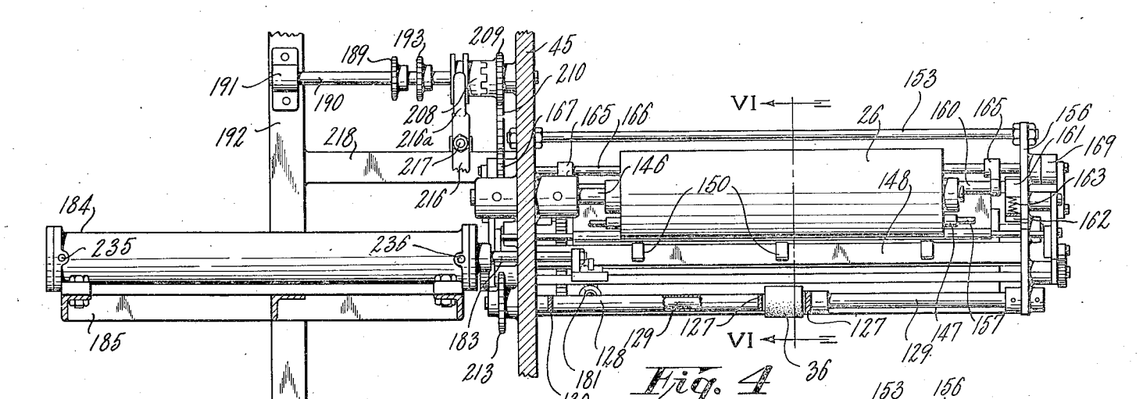
Fig. 4 is a view of a horizontal paper supply mechanism, partly in section, taken on lines IV—IV of Fig. 2.

Referring to Figs. 2 and 9, the shoe 37 which holds the plaited paper 25 to the inside circumference 27 of the tire 20, is secured to an arm 126 having a bifurcated end 127 which straddles the roller 36 and is fixed to a sleeve 128 which fits over and oscillates on the shaft 129 on which the roller 36 is mounted. As shown in Figs. 4 and 9, an arm 130 is fixed to the left end of the sleeve 128, and a spring 131 is attached at one end to the arm 130 and at the other end to a pin 132, which is fixed in the upright support 45. The spring 131 normally resiliently retains the shoe 37 in contact with the paper 25. When the bar 119 is raised upwardly a pin 133 on the bar 119 contacts with the arm 130 and moves the shoe through the oscillating action of the sleeve 128 and arm 126 away from the inner circumference of the tire 20 so that it may be removed from an insert in the machine.

*Mechanism for supporting and moving the rollers for holding the beads of the tire in close relationship*

As best shown in Figs. 1 and 2 the rollers 24 for holding the beads of the tire in close relationship are mounted on arms 134 and 135 and may be swung away from the bead portions of the tire 20 by pivoting the arms about the shafts 136 and 137 to which they are respectively fixed. The shafts 136 and 137 are mounted in an arm 138 projecting from the upright support 45 of the frame of the machine. Gears 139 and 140 mesh with each other and are keyed to the shafts 136 and 137 respectively. The shaft 136 may be oscillated by a lever 141 secured to its lower end as shown in Fig. 2. The outer end of the lever 141 is pivotally connected to the bifurcated end 142 of the bar 143 by a pin 144. The opposite end of the bar 143 is yieldably connected to the arm 125 fixed to the piston rod 47. The connection is made by a stud bolt 145 fixed to the arm 125 and having a reduced end extending through a slot 146 (Fig. 9) in the bar 143 and provided with a nut for holding the bar 143 loosely on the bolt 145. A compression spring 146a is compressed between the bolt 145 and a projection on the bar 143 to form the yieldable connection between the bar 143 and the arm 125.

*Plaiting mechanism*

Figure 6:
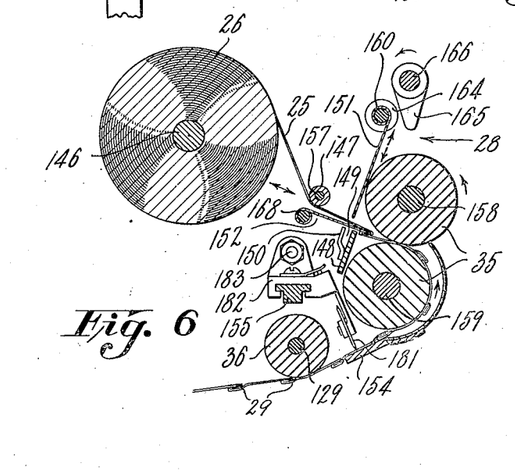
Fig. 6 is a view, in section, of the paper supply mechanism, taken on lines VI—VI of Fig. 4.
Figures 7, 8, 9, 10:
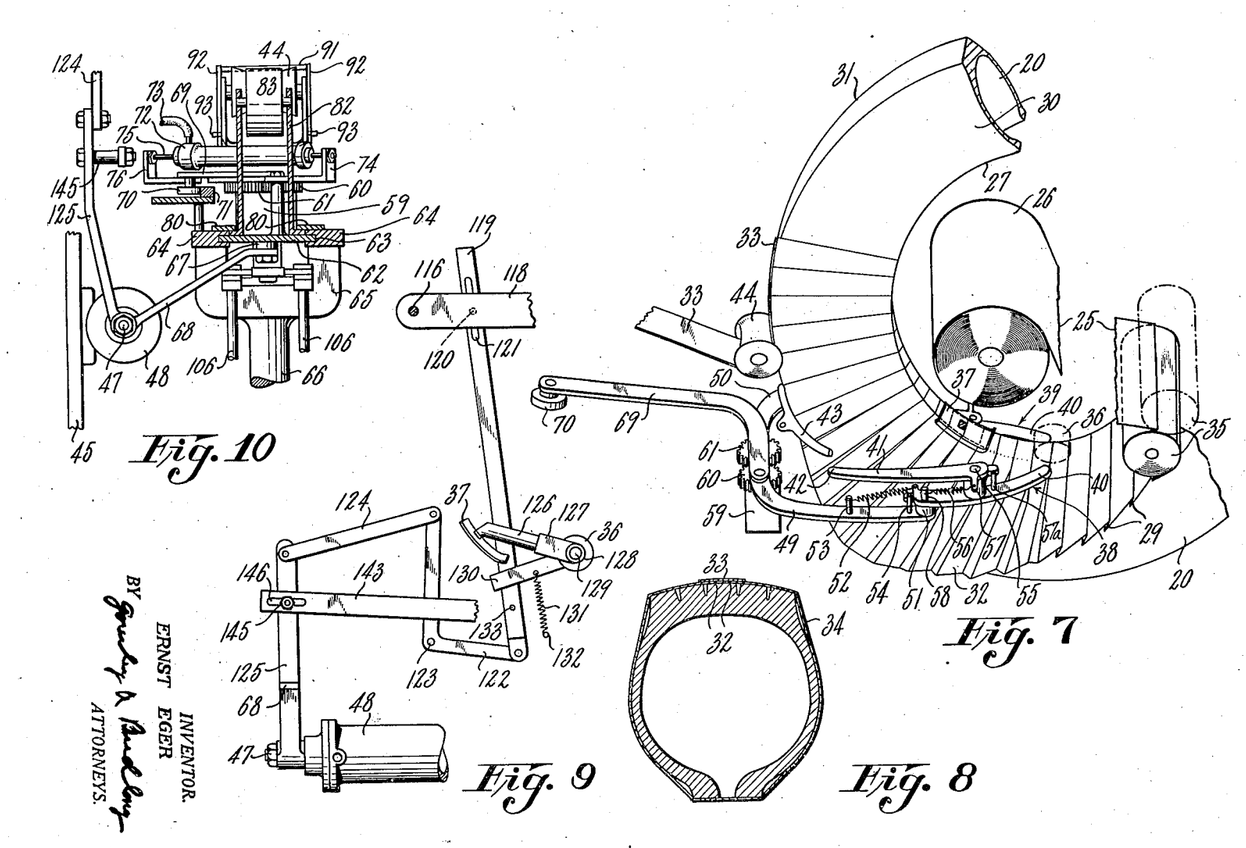
Fig. 7 is a fragmentary perspective view, showing a portion of a pneumatic tire with paper being applied thereto.
Fig. 8 is a cross sectional view of the annulus of the tire having a wrapper applied thereto.
Fig. 9 is a fragmentary view of link mechanism for transmitting motion to tire clamping and paper engaging mechanisms.
Fig. 10 is a view, partly in section and partly in elevation, of paper applying mechanism, taken on line X—X of Fig. 2.

Referring to Figs. 4 and 6 the plaiting mechanism 28 is supplied with the wrapping paper 25 from the roll 26, which is supported on a stub shaft 146 having a free end over which the roll 26 is slipped and having its other end fixed to the upright support 45 of the frame of the machine. The strip of paper 25 is led from the roll underneath a paper tensioning roll 147 and over the top of a plaiting bar 148 to the feed rolls 35, which form a part of the plaiting mechanism 28. A plurality of aligned grooves 149 are formed at the top edge of the bar 148 between it and a plurality of cleats 150 (Fig. 4). A transverse plate 151 is caused to reciprocate up and down in the direction as indicated by the arrows and its lower end forces a loop of the paper into the grooves 149, which is retained therein when the lower edge of the plate 151 is withdrawn. A transverse plate 152 is caused to reciprocate alternately with the plate 151 and across the tops of the grooves 149 in a direction substantially perpendicular to the movement of the plate 151. The movement of the plate 152 removes the loop of paper from the grooves 149 and forms a plait 29 therein for each complete reciprocation. As the plaits 29 are formed they are advanced towards the feed rolls 35 which are rotated intermittently to advance the plaited paper towards the paper applying roll 36.

The plaiting mechanism 28 is supported in a frame consisting of a spacer rod 153 and spacer bars 154 and 155, and the plaiting bar 148, all of which have one end attached to the upright support 45 and the projecting ends attached to a crescent shaped plate 156 which faces the front of the machine. Referring to Figs. 4 and 6 the tension roll 147 is mounted upon a shaft 157 having its ends (which are shown in Fig. 4 as broken off) mounted in the upright support 45 and the crescent shaped plate 156. The shafts 158 and 159 upon which the feed rolls 35 are mounted and the shaft 129 upon which the paper applying roll 36 is mounted are also rotatably mounted in the upright support 45 and the crescent shaped plate 156. The plaiting plate 151 is fixed to a bar 160 having its ends fixed against rotation in blocks 161 which are vertically slidable in guides 162, which are shown in Fig. 4 as cut away to show a spring 163 interposed between the bottom of the guide and the block. Each end of the bar 160 is provided with a cam roller 164 (Figs. 1, 4 and 6) which are actuated by cams 165 fixed to a shaft 166 having its ends rotatably mounted in the upright support 45 and crescent shaped plate 156. The shaft 166 is driven from a sprocket wheel 167 (Figs. 3 and 4) and rotates the cams 165 against the cam rollers 164 so as to move the plaiting plate 151 downwardly against the action of the springs 163 and permit the springs to move the plate in an upward direction and thereby reciprocate the lower end of the plaiting plate 151 into and out of the grooves 149.

Figure 3:
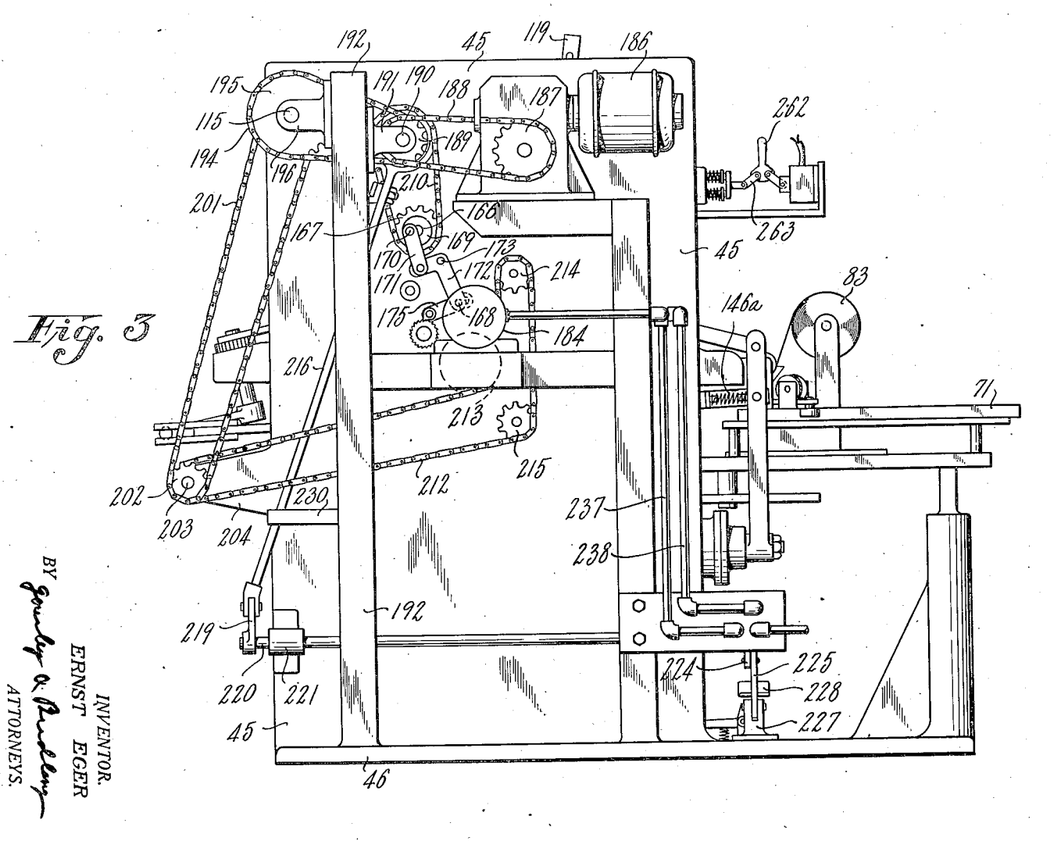
Fig. 3 is a rear view thereof in elevation.
Figure 5:
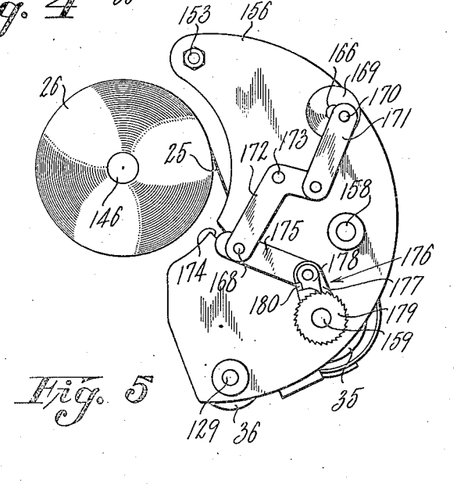
Fig. 5 is a diagrammatical end view of the paper supply mechanism shown in Fig. 4.

The lower transverse plaiting plate 152 is mounted on a transverse bar 168 having its ends extending through the crescent shaped plate 156 and the upright support 45. The ends of the bar 168 are reciprocated by similar mechanisms which are actuated from the shaft 166 and are mounted on the crescent shaped plate 156 and upright support 45 respectively, as shown in Figs. 3 and 5. Since these mechanisms are alike only one need be described in detail. The mechanisms comprise eccentric discs 169 having eccentric pins 170 connected by links 171 to bell crank levers 172 which latter are pivoted on pins 173 to the crescent shaped plate 156 or the upright support 45, as the case may be. The crescent shaped plate 156 and the upright support 45 are provided with guide slots 174, within which the ends of the bar 168 are slidably mounted. The outer ends of the bar 168 are connected to the lower ends of the bell crank levers 172 which are oscillated about the pivots 173 and thereby reciprocate the transverse plaiting plate 152 back and forth over the plaiting bar 148 (Fig. 6).

The feed rolls 35 are caused to rotate intermittently by mechanisms actuated from the lower ends of the bell crank levers 172. Such mechanisms comprise links 175 pivotally connected at one of their ends to the ends of the bar 168 and at the other of their ends to ratchet mechanisms 176 each of which comprise an arm 177 pivoted on the shaft 159 to which the lower feed roll 35 is keyed. The ends of the shaft 159 are intermittently rotated by pawls 178 pivoted on the arms 177. The pawls 178 cooperate with ratchet wheels 179 keyed to the shaft 159. When the pawls 178 are moved in a clockwise direction by the bar 168, as viewed in Fig. 5, stops 180 prevent the counter-clockwise movement of the pawls 178, and the shaft 159 is moved in a clockwise direction by the pawls. The ratchet mechanisms 176 permit the arms 177 to move in the counter-clockwise direction without producing any movement of the shaft 159 and thereby produce the intermittent movement of the feed rolls 35 which cooperate with one another.

*Mechanism for cutting the strip of wrapping paper*

After a sufficient length of wrapping paper 25 has been plaited by the plaiting mechanism 28 to extend around the inner and outer circumferences of the tire 20, the plaiting mechanism is stopped by disengaging the clutch 208 (Fig. 4) and the strip of plaited wrapping paper 25 is simultaneously cut by a circular knife 181 (Fig. 6) secured to a head 182 which is slidable on the spacer bar 155 and is operated by a piston rod 183 connected to a double acting piston in the cylinder 184 (Fig. 4). The movement of the piston in the cylinder 184 is controlled by the mechanism hereinafter to be described which controls the clutch 208, and it is so controlled that the piston is caused to make a single stroke each time the clutch 208 is disengaged so as to move the circular knife 181 across the plaited paper 25 along the spacer bar 154 and thereby sever the paper each time the plaiting mechanism is stopped.

*Mechanism for driving the upper and lower tire supporting belts, the plaiting mechanism, and the roll which applies the paper to the inner circumference of the tire*

Referring to Figs. 1, 2 and 3, the above mechanisms are driven from a motor 186 which drives a sprocket 187 having a chain 188 meshing therewith and driving a sprocket 189, which is keyed to a shaft 190 mounted at one end in a bracket 191 secured to a post 192 fixed to the base 46 of the machine, and mounted at the other end in the upright support 45. A sprocket 193 is keyed to the shaft 190 and drives a chain 194 which in turn drives a sprocket 195 which is keyed to the shaft 115, upon which the pulley 113 which supports one end of the belt 22 is mounted. The shaft 115 is supported at one end in a bracket 196 secured to the post 192 and is supported at its mid point by a bearing in the upright support 45. A sprocket 197 is keyed to the shaft 115 and drives a sprocket chain 198 which in turn drives a sprocket wheel 199 keyed to the shaft 116 upon which the other end of the belt 22 is supported on the pulley 114 mounted on the shaft.

The lower belt 21 for supporting and rotating the tire 20 is driven from the shaft 115 having a sprocket 200 keyed thereto and which drives a chain 201, which in turn drives a sprocket wheel 202 keyed to a shaft 203 rotatably mounted in an arm 204 projecting from the upright support 45. A sprocket 205 is keyed to the shaft 203 and drives a sprocket chain 206 (Fig. 2), which in turn drives a sprocket wheel 207, which is keyed to the shaft 98 to which the pulley 96 which supports one end of the belt 21 is secured.

The roll 36 which applies the wrapping paper 25 to the inner circumference of the tire 20 is mounted on the shaft 129 and is driven from a sprocket wheel 211 (Figs. 1 and 3) which is keyed to the shaft 203 and drives a sprocket chain 212 which meshes with a sprocket wheel 213 keyed to the shaft 129. The sprocket chain 212 is passed over idler sprockets 214 and 215 so that it can engage the sprocket 213.

Referring to Figs. 1, 3 and 4 the plaiting mechanism 28 is driven from the shaft 190 through the clutch mechanism 208 which is adapted to be engaged with and disengaged from a sprocket wheel 209 rotatively mounted on the shaft 190. The sprocket wheel 209 drives a sprocket chain 210 which in turn drives the sprocket wheel 167, which is keyed to the shaft 166 which drives the plaiting mechanism 28 hereinbefore described.

*Mechanism for starting and stopping the plaiting mechanism and for controlling the paper cutting cylinder*

After a sufficient length of paper 25 has been plaited to extend around the inner and outer circumferences of the tire 20, the plaiting mechanism is stopped by disengaging the clutch 208 (Fig. 4) by the movement of the lever 216 which is pivoted on a pin 217 secured to a support 218 which extends between the post 192 and upright 45 of the frame of the machine. The upper end of the lever 216 is provided with a yoke 216a which engages the clutch 208, and the lower end of the lever 216 is connected to an arm 219 (Fig. 3) fixed to an oscillatable shaft 220 mounted at one end in a bracket 221 secured to the upright support 45. The opposite end of the shaft 220 is mounted in a bracket 222 (Fig. 1) secured to the upright support 45, and it is provided with an arm 223 (Fig. 12) which is connected by a link 224 to one end of a bell crank lever 225 pivoted on a pin 226 mounted in a bracket 227 secured to the base 46 of the machine. The other end of the lever 225 is provided with a foot pedal 228 which is adapted to be moved downwardly from the position shown in Fig. 2 against the action of a spring 229 (Fig. 1) having one end attached to the lower end of the clutch operating rod 216, and the other end attached to a bracket 230 secured to the post 192. The downward movement of the foot pedal 228 disengages the clutch 208 which is normally held in engagement by the spring 229. The foot pedal 228 is retained in its downward position by a detent 231 (Fig. 2) on one arm of a bell crank lever 232 pivotally mounted on the bracket 227. When the foot pedal 228 is moved downward the detent 231 is moved over the arm of the bell crank lever 225 adjacent to the foot pedal 228 by means of a compression spring 233 which urges the arm 234 of the lever 232 in an upward position. In order to release the foot pedal 228 so that the clutch 208 can be engaged by the action of the spring 229, the operator steps on the arm 234 of the lever 232 and disengages the detent 231 from the lever 225.

Air is supplied to the ends of the paper cutting cylinder 184 through openings 235 and 236 (Fig. 4) which are connected respectively to the pipes 237 and 238 (Fig. 1) which lead to the valve assembly 239. Air is supplied to the valve assembly 239 through a supply pipe 240 and it is exhausted from the valve assembly through the opening 241. The valve assembly is of the conventional type having a pair of inlet and exhaust valves for controlling the flow of air through the pipes 237 and 238. Each pair of valves is controlled by valve stems 242 and 243 which are provided with the conventional snap acting mechanism which retains one of the valve stems in a downward position and the other in an upward position as viewed in Fig. 1 until such mechanism is reversed. The valve stems 242 and 243 are operated by a lever 244 pivoted midway between its ends on the valve assembly 239. The lever 244 is provided with a slot 245 having notches 246 in each end. A link 247 has a bifurcated end connected to the lever 244 by a pin 248 (Fig. 12) which extends through the bifurcated end and the slot 245. The other end of the link 247 is pivotally connected to a link 249 by a pin 250, and the link 249 is pivotally connected to the arm 223 on the oscillatable shaft 220. A snap acting movement between the link 247 and 249 is provided by a spring 251, connected at one end to a post 252 secured to the link 249 and at the other end to a post 253 secured to the link 247.

The operation of the valve assembly 239 is as follows: Referring to Figs. 1 and 12, when the operator steps on the foot pedal 228 the link 224 pulls the arm 223 and the links 249 and 247 connected thereto so as to move one end of the lever 244 away from the valve assembly 239. The pivotal movement of the lever 244 reverses the valves operated by the stems 242 and 243. When the foot pedal 228 is released by the bell crank lever 232, the pin 248 is pushed to the opposite side of the slot 245 and out of the notch 246 therein and along the slot 245 to the end then nearest the valve assembly 239, without changing the position of the valve stems 242 and 243. In this manner the piston in the cylinder 184 is caused to make one stroke each time the foot pedal 228 is moved downwardly and no movement of the piston is caused by the upward movement of the foot pedal 228 which permits the clutch 208 to be engaged by the spring 229 and start operation of the plaiting mechanism 28.

*Controls for the rotary motor drive and cylinder which operate the tire holding and paper folding and applying mechanisms*

The motor 186 which operates the rotary drive is controlled by a conventional make and break switch 254, and the admission of air to the cylinder 48 is controlled by a conventional valve assembly 255 which is supplied with air through the pipe 256 and admits and exhausts air to the ends of the cylinder 48 through the pipes 257 and 258 which are connected respectively to the openings 259 and 260 in the ends of the cylinder 48, the air being exhausted from the valve assembly through the exhaust opening 261. The switch 254 and the valves in the valve assembly 255 are simultaneously operated by a handle 262 which is connected to the switch and the valve assembly through the toggle mechanism 263. In the position shown in Fig. 2 the handle has been moved into position whereby the electrical circuit is made and air is being admitted to the cylinder through the pipe 258 and exhausted from the cylinder through the pipe 257, so as to move the piston rod 47 to the position shown in Fig. 2. In order to break the circuit and to reverse the movement of the piston rod 47 the handle 262 is pushed downwardly.

*Operation*

Since the parts of the machine are shown in the position they occupy while the tire is being wrapped, the description of the operation of the machine will be begun with the parts in such position. Referring particularly to Fig. 2, while the tire is being wrapped it is rotated in the direction of the arrow A by the lower and upper belts 21 and 22, the paper is drawn from the roll 26 and plaited by the plaiting mechanism 28 and applied to and folded around the transverse contour of the tire by the paper folding and applying mechanisms, as shown in Figs. 6 and 7, and the longitudinal edges of the paper are joined on the tread portion of the tire by an adhesive strip 33. Assuming that most of the tire has been wrapped and a sufficient length of paper has been plaited to extend around the inner and outer circumference of the tire, the plaiting mechanism 28 is stopped by disengaging the clutch 208 and the paper is cut in the desired length by moving the circular knife 181 across the paper 25 along the bar 154. These operations are simultaneously produced by stepping on the foot pedal 228 and moving it downward. The detent 231 on a bell crank lever 232 holds the foot pedal in its downward position while the tire 20 continues to rotate until the entire cut length of plaited paper has been wrapped around the tire and its longitudinal edges have been joined by the adhesive paper strip 33. When this is done the operator moves the handle 91 to the left as viewed in Fig. 2, so as to move the adhesive paper applying roll 44 away from the tread of the tire 20. Then he immediately cuts the adhesive strip between the roll and the tire.

The tire has now been completely wrapped and in order to remove it from the apparatus the operator pushes down on the handle 262 which operates the switch 254 to break the circuit of the motor 186 and thereby stop the rotation of the tire 20. When the handle 262 is pushed downwardly the valves in the valve assembly 255 are actuated so as to admit air to one end of the cylinder 48 and exhaust it from the other end, and thereby move the piston rod 47 outwardly from the end of the cylinder 48 and cause all of the elements operating directly upon the tire, excepting the paper applying roll 36, to move away from their wrapping positions substantially simultaneously. In reference to Fig. 2, the paper folding fingers 40 and 41 are moved to the left and away from the walls of the tire, and the carriage 79 which support the paper folding shoes 43 and the adhesive paper strip applying mechanism is also moved to the left. The lower tire supporting belt 21 is moved downwardly and the upper belt 22 is swung upwardly about the shaft 115 while the tire bead positioning rollers 24 are swung outwardly and the inner paper holding shoe 37 is swung inwardly towards the center of the tire. When the parts are moved in such positions the tire can be removed from the machine, and another tire to be wrapped can be inserted.

The next tire to be wrapped is slipped over the ends of the wrapping paper roll 26 and the tire plaiting mechanism 28, and its annulus is inserted between the pairs of fingers 40 and 41 and the bead positioning rollers 24 while the tread of the tire is supported by the lower belt 21. The operator then pulls the switch and valve handle 262 upwardly so as to start the motor 186 and move the piston rod 47 inwardly and thereby return the parts of the machine to the position shown in Fig. 2. With the parts in such position the tire is rotated and held in position to be wrapped. The operator then releases the foot pedal 228 and permits the clutch 208 to be engaged and thereby start operation of the plaiting mechanism 28. The paper then begins to be applied to the inner circumference of the tire and to be folded transversely around the tire. When the paper wrapping 25 comes opposite the adhesive paper applying roll 44 the operator wets the end of the adhesive and applies it to the longitudinal edges of the wrapping paper to join them together. The operator then releases the adhesive paper applying roll 44 with the handle 91 so that it will be resiliently pressed by the spring 94 against the tread of the tire and thereby unite such edges as the tire is rotated. After most of the tire has been thus wrapped and sufficient paper has been plaited to extend around the inner and outer circumferences of the tire with at least some lap, the plaiting mechanism is stopped and the paper is cut and the tire is then removed from the machine as before described. The operation may then be repeated.

While this invention has been described in detail, it will be understood that changes may be made therein without departing from the spirit of the invention and the scope of the appended claims.

Having thus described my invention, what I claim and desire to protect by Letters Patent is:

1. An apparatus for wrapping tires comprising means for holding the bead portions of the tire in close axial relationship, means for progressively applying a sheet of wrapping material having doubled over transverse plaits circumferentially to the rim perimeter of the tire, means for guiding the material around the transverse contour of the tire, means for securing the longitudinal margins of the material together along the tread of the tire, and means for supporting and continuously rotating the tire while the above mentioned means operate on the tire and wrapping material.

2. An apparatus for wrapping an annular object comprising means for supporting and rotating the object, means extending within the inner circle of the object for supporting a roll of wrapping material, means for forming transverse plaits in the wrapping material by doubling the material back upon itself and along lines extending entirely across the material, means for progressively applying the plaited wrapping material to the outer surface of the object along such inner circle, means having surface substantially surrounding the annulus of the object in a transverse direction for guiding the material around the transverse contour of the object so as to gradually unfold said plaits toward the outer circumference of the object, and means for securing the longitudinal margins of the material together along the outer circumference of the object.

3. An apparatus for wrapping an annular object comprising a pair of spaced belts adapted to be moved toward and away from the outer periphery of the object for engaging and disengaging same, means for driving both of said belts, means extending within the inner circle of the object for supporting a roll of wrapping material, means for forming transverse plaits in the wrapping material, means for applying the plaited wrapping material to the outer surface of the object along such inner circle, means for guiding the material around the transverse contour of the object, and means located between said belts for applying an adhesive strip of material around the outer periphery of the wrapped object and to the marginal portions of the wrapping material whereby such portions are secured together.

4. An apparatus for wrapping a tire, comprising means for supporting and rotating the tire, rollers for engaging the opposite sides of the tire close to the beads for maintaining the beads in relatively close relationship, means for progressively wrapping a sheet of wrapping material around the transverse contour of the tire as the material is applied circumferentially to the rim periphery of the tire, said wrapping means comprising a plurality of fingers curved to the transverse contour of the tire to resiliently engage the tire wrapping material for smoothing the wrapping material and causing it to conform to the transverse contour of the tire, and means for moving said fingers into and out of operating engagement with the tire wrapping material.

5. An apparatus for wrapping an annular object, comprising means for supporting and rotating the object, means for holding a roll of wrapping material within the inner circle of the annulus of the object, means extending within such inner circle for plaiting the wrapping material, said plaiting means comprising a transverse member having a groove formed therein, a transverse reciprocating plate having an edge adapted to reciprocate into and out of said groove and force the wrapping material into said groove, a plate having an edge adapted to reciprocate across said groove and form folds in the wrapping material, means for advancing the plaited wrapping material into contact with the inner circumference of the object, means for guiding the plaited wrapping material around the transverse contour of the object, and means for securing the edges of the material together along the outer circumference of the object.

6. The method of wrapping a tire comprising the steps of rotating the tire, continuously drawing a sheet of wrapping paper from a supply roll extending within the circle of the tire rim, forming continuous plaits in the wrapping paper transversely of its length and progressively applying the plaited paper directly to the rim circumference of the tire so that the transverse edges of the outer overlapping layers of the plaits face in the direction opposite to the direction of rotation of the tire, progressively wrapping the plaited paper around the transverse contour of the tire, applying pressure to the plaits as the tire is rotated so as to cause the plaits to gradually unfold from the rim circumference towards the tread of the tire and lie close to the surface of the tire, severing the paper transversely from the supply roll upon substantial completion of the circumferential wrapping, and joining the margins of the paper circumferentially at the outer periphery of the tire.

7. The method of wrapping a tire comprising the steps of rotating the tire, holding the beads of the tire in a position closer together than their normal position, continuously drawing a sheet of wrapping paper from a supply roll extending within the circle of the tire rim, forming continuous plaits in the wrapping paper transversely of its length and progressively applying the plaited paper directly to the rim circumference of the tire so that the transverse edges of the outer overlapping layers of the plaits face in the direction opposite to the direction of rotation of the tire, progressively wrapping the plaited paper around the transverse contour of the tire and simultaneously unfolding of the plaits as the plaited paper is progressively wrapper toward the outer circumference of the tire and the tire is rotated, severing the paper transversely from the supply roll upon substantial completion of the circumferential wrapping, and applying an adhesive strip of material to the crown of the wrapped tire for joining the longitudinal margins of the wrapping paper.

8. An apparatus for wrapping an annular object comprising means for progressively applying a sheet of wrapping material having continuous transverse doubled over plaits to the inner circumference of the annulus of the object, means extending substantially around the transverse contour of the annulus of the object for progressively wrapping the material around the transverse contour of the annulus and unfolding the plaits towards the outer circumference thereof, means for securing the longitudinal margins of the wrapping material together along the outer circumference of the annulus, and means for supporting and rotating the object so as to carry said material successively into cooperation with the several aforesaid means acting thereon simultaneously during the rotation of the object.

9. An apparatus for wrapping an annular object comprising means for progressively applying a sheet of wrapping material having continuous transverse doubled over plaits to the inner circumference of the annulus of the object, means for progressively wrapping the material around the transverse contour of the annulus and unfolding the plaits towards the outer circumference thereof, means for securing the longitudinal margins of the wrapping material together along the outer circumference of the annulus, means for supporting and rotating the object so as to carry said material successively into cooperation with the several aforesaid means acting thereon simultaneously during the rotation of the object, means for moving said transverse wrapping means away from and towards said object to permit the object to be placed upon the support and to permit said wrapping means to operate upon the wrapping material.

10. An apparatus for wrapping an annular object comprising means for forming transverse plaits containing folded over material in the wrapping material, means extending substantially around the transverse contour of the annulus of the object for wrapping said plaited material transversely around the annulus of the object from the inner periphery and gradually unfolding said plaits towards the outer periphery of the annulus by pressing the material against the object substantially around its entire transverse periphery, means for adhering the longitudinal margins of the wrapping material together on the outer periphery of the annulus of the object, and means for continuously rotating the object while said foresaid means are operating upon the wrapping material and to carry the wrapping material from one station to another to be operated upon.

11. The method of wrapping an annular object with material having transversely extending plaits containing over-lapping layers, comprising the steps of continuously rotating the object during the operation of the method, progressively applying a sheet of wrapping material to the inner circumference of the object so that the transverse edges of the outer overlapping layers of plaits face in the direction opposite to the direction of the rotation of the object, progressively wrapping the material around the transverse contour of the object, and progressively unfolding the plaits from the inner circumference of the object towards the outer circumference thereof, applying pressure to the plaits as the tire is rotated so as to cause them to lie close to the surface of the object with the edges of the outer layers facing in the direction opposite to the direction of the rotation of the object, and securing the longitudinal edges of the material together on the outer circumference of the object.

12. The method of wrapping a pneumatic tire with material having transversely extending plaits containing overlapping layers, comprising the steps of continuously rotating the tire during the operation of the method, forming transversely extending plaits having overlapping layers in a strip of wrapping material, progressively applying the plaited strip of material to the rim periphery of the tire so that the transverse edges of the outer overlapping layers of plaits face in the direction opposite to the direction of rotation of the tire, progressively wrapping the material around the transverse contour of the tire, and progressively unfolding the plaits from the rim periphery of the tire towards the tread surface of the tire, applying pressure to the plaits as the tire is rotated so as to cause them to lie close to the surface of the tire with the edges of their outer layers facing in the direction opposite to the direction of the rotation of the tire, and securing the longitudinal edges of the material together opposite the tread surface of the tire.

13. The method of wrapping a pneumatic tire with material having transversely extending plaits containing overlapping layers, comprising the steps of continuously rotating the tire during the operation of the method, forming transversely extending plaits having overlapping layers in a strip of wrapping material, holding the beads of the tire relatively close together, progressively applying the plaited strip of material to the rim periphery of the tire so that the transverse edges of the outer overlapping layers of plaits face in the direction opposite to the direction of rotation of the tire, progressively wrapping the material around the transverse contour of the tire, and progressively unfolding the plaits from the rim periphery of the tire towards the tread surface of the tire, applying pressure to the plaits as the tire is rotated so as to cause them to lie close to the surface of the tire with the edges of their outer layers facing in the direction opposite to the direction of the rotation of the tire, and securing the longitudinal edges of the material together opposite the tread surface of the tire.

ERNST EGER.